United States Patent
Hansen et al.

(10) Patent No.: US 11,866,048 B2
(45) Date of Patent: Jan. 9, 2024

(54) LIMP HOME MODE FOR A BATTERY ELECTRIC VEHICLE

(71) Applicant: Volvo Car Corporation, Gothenburg (SE)

(72) Inventors: Sören Hansen, Gothenburg (SE); Nicklas Leuchovius, Gothenburg (SE); Sebastian Skoog, Gothenburg (SE); Alma Ciric, Gothenburg (SE); Adrian Thuresson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 223 days.

(21) Appl. No.: 17/193,207

(22) Filed: Mar. 5, 2021

(65) Prior Publication Data
US 2021/0276556 A1 Sep. 9, 2021

(51) Int. Cl.
*B60W 30/182* (2020.01)
*B62D 5/04* (2006.01)
(Continued)

(52) U.S. Cl.
CPC .......... *B60W 30/182* (2013.01); *B60K 35/00* (2013.01); *B60L 50/60* (2019.02); *B60L 58/10* (2019.02);
(Continued)

(58) Field of Classification Search
CPC .............. B60W 30/182; B60K 35/00; B60K 2370/172; B60L 58/10; B60L 58/12; B60L 58/18; B60L 58/27; B60L 2240/54; B60L 2240/545; B60L 2240/80; B60L 2250/16; B60L 2260/20; B60L 3/04; B60L 3/0084; B60L 3/0046; B60L 1/003; B60L 3/12; B62D 5/0484; Y02T 10/70
See application file for complete search history.

(56) References Cited

U.S. PATENT DOCUMENTS 6,336,063 B1 * 1/2002 Lennevi ................ B60W 20/00
903/910
6,705,418 B2 * 3/2004 Wessman .............. H01M 10/64
180/68.5
(Continued)

FOREIGN PATENT DOCUMENTS

CN 102463897 A 5/2012
CN 106671781 A 5/2017
(Continued)

OTHER PUBLICATIONS

Extended EP Search Report for EP Application No. 20161548.1 dated Oct. 5, 2020, 15 pages.

*Primary Examiner* — Mussa A Shaawat
(74) *Attorney, Agent, or Firm* — Amin, Turocy & Watson, LLP (57) ABSTRACT

The disclosure relates to a safety system for a battery electric vehicle (BEV) that comprises one or more electromotors powered by a battery system, wherein the safety system allows a "limp home mode" to be activated. The disclosure further relates to a battery electric vehicle provided with such a safety system. The battery system of the electric vehicle preferably is the sole power supply of the vehicle for powering the one or more electromotors for a prolonged period of time, e.g. a period of time greater than 10 minutes.

20 Claims, 2 Drawing Sheets

(51) Int. Cl.
*B60L 50/60* (2019.01)
*B60L 58/27* (2019.01)
*B60L 58/18* (2019.01)
*B60L 58/12* (2019.01)
*B60K 35/00* (2006.01)
*B60L 58/10* (2019.01)

(52) U.S. Cl.
CPC ............... *B60L 58/12* (2019.02); *B60L 58/18* (2019.02); *B60L 58/27* (2019.02); *B62D 5/0484* (2013.01); *B60K 2370/172* (2019.05)

(56) References Cited

U.S. PATENT DOCUMENTS

| | | | |
|---|---|---|---|
| 6,755,266 B2 * | 6/2004 | Lasson | B60W 20/10 |
| | | | 903/910 |
| 8,831,816 B2 | 9/2014 | Kwon et al. | |
| 9,862,275 B2 | 1/2018 | Cha et al. | |
| 9,899,948 B2 * | 2/2018 | Butzmann | H02P 25/22 |
| 10,189,470 B2 | 1/2019 | Atluri et al. | |
| 11,133,690 B1 * | 9/2021 | Chen | H02J 7/00032 |
| 11,245,547 B2 * | 2/2022 | Antonsson | H04L 45/30 |
| 11,603,013 B2 * | 3/2023 | Eriksson | B60L 3/003 |
| 2008/0304189 A1 * | 12/2008 | Tang | H02H 7/1222 |
| | | | 318/434 |
| 2015/0162855 A1 * | 6/2015 | Chien | H02P 27/085 |
| | | | 318/139 |
| 2016/0006276 A1 * | 1/2016 | Mikulec | H02J 7/0014 |
| | | | 307/19 |
| 2016/0280218 A1 | 9/2016 | Oba et al. | |
| 2017/0214256 A1 * | 7/2017 | Hardy | H02J 7/007182 |
| 2017/0240160 A1 * | 8/2017 | Park | B60L 50/16 |
| 2017/0282910 A1 | 10/2017 | Kim et al. | |
| 2018/0029474 A1 | 2/2018 | Berels et al. | |
| 2018/0105041 A1 | 4/2018 | Ortner et al. | |
| 2018/0105164 A1 * | 4/2018 | Jung | B60W 20/50 |
| 2020/0139833 A1 * | 5/2020 | Maeda | H02M 1/08 |
| 2020/0247239 A1 * | 8/2020 | Stoltz | B60W 10/26 |
| 2020/0339048 A1 * | 10/2020 | Ferré Fàbregas | H02J 13/00002 |
| 2022/0149451 A1 * | 5/2022 | Burchardt | H01M 10/4257 |

FOREIGN PATENT DOCUMENTS

| | | |
|---|---|---|
| CN | 107618353 A | 1/2018 |
| CN | 107901904 A | 4/2018 |
| CN | 108001232 A | 5/2018 |
| CN | 108146249 A | 6/2018 |
| CN | 108177525 A | 6/2018 |
| CN | 108674188 A | 10/2018 |
| CN | 108931725 A | 12/2018 |
| CN | 110803030 A | 2/2020 |
| EP | 3476647 A1 | 5/2019 |
| JP | 2016123198 A | 7/2016 |
| KR | 20120063299 A | 6/2012 |

\* cited by examiner

LIMP HOME MODE FOR A BATTERY ELECTRIC VEHICLE

CROSS-REFERENCE TO RELATED APPLICATIONS

This application claims priority to EP patent application no. 20161548.1 filed 6 Mar. 2020, entitled "Limp home mode for a battery electric vehicle." The entirety of the aforementioned application is hereby incorporated herein by reference.

TECHNICAL FIELD

The disclosure relates to a safety system for a battery electric vehicle (BEV) that comprises one or more electromotors powered by a battery system, wherein the safety system allows a "limp home mode" to be activated. The disclosure further relates to a battery electric vehicle provided with such a safety system. The battery system of the electric vehicle preferably is the sole power supply of the vehicle for powering the one or more electromotors for a prolonged period of time, e.g. a period of time greater than 10 minutes.

BACKGROUND ART

Electrical vehicles that are fully powered by a battery system are known to provide a driver with an indication of State of Charge (SoC) of the battery and/or an indication of the range, in miles or km, left in the battery for powering driving of the vehicle without having to recharge the battery. When the SoC is at almost empty, the driver is shown a warning, e.g. by displaying on a dashboard display a turtle or other indication of low battery charge. The vehicle may then still be driven at a lower power consumption in a so called "limp home" or "turtle" mode during which regenerative braking can result in partial recharging of the battery. Once the SoC reaches a predetermined lower threshold, the battery is typically disconnected from the propulsion system of the vehicle to avoid damage to the battery system.

Modern electric vehicles comply with ISO standard 26262-9:2018 which provides a risk classification scheme for the automotive industry. The standard defines a number of Automotive Safety Integrity Levels (ASIL levels) which indicate a risk of potentially life-threatening or fatal injuries in the event of malfunction of equipment. Propulsion power loss due to low SoC is generally considered to conform to ASIL level QM which is indicative of operation within safety margins and does not dictate that further safety requirements have to be put into place to mitigate the effects of propulsion power loss.

Battery events such as a thermal event during driving, or a thermal event during charging, typically fall within ASIL levels B, C or D, which require that safety measures for mitigating the effect of these risks are provided, e.g. by disconnecting the battery system when a thermal event is detected, in order to prevent outgassing of the batteries. In vehicles which are provided with redundant power supplies for the vehicle propulsion system it is possible to disconnect the battery system and switch the propulsion system to another power supply to avoid propulsion power loss in case of battery system failure.

However, in electric vehicles which are not equipped with a redundant power supply that is suitable for long term powering one or more motors of the propulsion system of the vehicle, any safety error that is detected in operation of the battery system results in the battery system being disconnected, and thus a loss of propulsion.

It is an object to provide a safety system for an electric vehicle, which allows the electrically powered vehicle to limp home in case of a safety related error in the battery system or Battery Management System (BMS) of the vehicle without requiring a redundant power supply. It is a further object to provide an electric vehicle that comprises such a safety system.

SUMMARY OF THE INVENTION

According to a first aspect the disclosure provides a safety system for an electric vehicle, said vehicle comprising consumers of electricity, wherein said consumers are partitioned into a first group of consumers of electricity adapted for powering steering and propulsion of the vehicle, and a second group of consumers, the safety system being configured to be in communication with a battery management system, BMS, of the vehicle; and wherein the safety system is adapted for, upon detection of one or more safety related errors in operation of the BMS and/or in operation of a battery system of the vehicle, controlling the BMS to switch to:

a) a limp home mode, in case a safety related error in operation of the BMS is detected which is within predetermined safety margins and it is detected that all cells of the battery system operate within their predetermined rated voltage range and predetermined rated temperature range, wherein in the limp home mode the charging power of the battery system is set to zero; and b) a disconnect mode, in case the battery system is detected as operating outside predetermined safety margins or one or more safety related errors in operation of the BMS outside predetermined safety margins are detected, wherein in the disconnect mode the battery system is completely disconnected from the consumers after a predetermined amount of time from said detecting.

According to the disclosure a safety related error detected in the BMS or battery system does not necessarily result in the battery system being disconnected from the one or more electromotors which are part of the vehicle's propulsion system. Instead, a graceful degradation of vehicle performance is provided. The one or more electromotors are part of the first group of consumers which are arranged to draw power from the battery system via the BMS. As long as the BMS and battery system operate within predetermined safety limits sufficient power may still be discharged from the battery system to the electromotors to drive the vehicle in the limp home mode. In this manner a single relatively small safety related error in the battery system or in BMS will not cause complete standstill of the vehicle due to the battery system being disconnected. As charging of the battery system, e.g. due to regenerative braking, is prohibited in the limp home mode as well as the disconnect mode, the risk of outgassing of the battery system due to a thermal event is reduced. The risks associated with errors which result in the limp home mode and the disconnect mode are thus at least partially mitigated, while in the limp home mode the vehicle can keep on driving without the use of a power supply other than the battery system.

The predetermined rated ranges of the battery cells which define normal operation ranges for battery cells are generally provided by the manufacturers of the battery cells. The predetermined safety margin of the battery system depends on these rated ranges, and generally also depends on how many of the cells operate outside of their rated ranges. For instance, the individual battery cells may be rated to operate between 2.0 and 2.2 volts, at a temperature of between 10° C. and 40° C., and may still function within their safety margins at temperatures between 40° C. and 50° C., or at voltages between 2.2 and 2.3 volts. The entire battery system operates within its safety margin if all battery cells operate within their rated range, in which case, if no safety related errors are detected in operation of the BMS, the BMS remains in a normal mode in which charging of the battery system is allowed. In case all cells operate within their rated voltage and/or temperature ranges, but a safety related error is detected in the BMS which is within predetermined safety margins, the BMS is switched to the limp home mode. In case a hardware error is present in the BMS or in a communication path with the BMS, this will generally result in detection of a safety related error in operation of the BMS.

The safety system of the disclosure does not prohibit limiting the discharge of the battery system when no safety related errors are detected, e.g. when the battery system's State of Charge is merely low without any indication of hardware errors in the BMS or hardware or other errors in the battery system. When no safety related errors are detected the BMS may still allow recharging of the battery system during driving of the vehicle, e.g. via regenerative braking.

In an embodiment, the predetermined time after which the battery system is disconnected is between 10 and 120 seconds after the safety system has controlled the BMS to switch to the disconnect mode. In the time between the start of the disconnect mode and the actual disconnecting of the battery system, a message may be displayed to the driver warning him or her that propulsion of the vehicle will be stopped.

In an embodiment, switching the BMS to the limp home mode further comprises limiting the discharge power of the battery system to a first predetermined peak discharge value and a first predetermined continuous discharge value. The peak discharge value refers to the maximum amount of power that the BMS allows to be drawn from the battery system during a predetermined time interval, e.g. a time interval of 20 second or less, or 10 seconds or less, and the continuous discharge value here refers to maximum amount of power that the BMS allows to be drawn from the battery system for prolonged period of time which is greater than the predetermined time interval, e.g. at least 10 minutes. Preferably, the first predetermined peak discharge value is 60 kW or less, preferably 45 kW or less over max. 10 seconds, and preferably the first predetermined continuous discharge value is 25 kW or less, preferably 20 kW or less.

In an embodiment the safety system is adapted for, upon detection of one or more safety related errors in operation of the BMS and/or in operation of a battery system of the vehicle, controlling the BMS during driving of the vehicle, to switch to: c) a degraded performance mode, in case it is detected that only one or two battery cells of the battery system operate outside their predetermined rated voltage range and/or outside their predetermined rated temperature range but within predetermined safety margins, wherein in the degraded performance mode charging of the battery system is blocked and peak discharge power of the battery system is limited to within a second predetermined discharge value.

It is fairly common for one or two cells of a battery system to, at least temporarily, operate outside their rated voltage and/or rated temperature range but within predetermined safety margins. As long as only one or two cells have such an error, the risk of a thermal event occurring in the battery system is generally very low. If no further safety related errors are detected, the safety system will then control the BMS to switch to the degraded performance mode in which charging of the battery, e.g. regenerative charging, is blocked to prevent further damage to the battery system.

Preferably, the safety system is adapted for controlling the BMS to switch to the limp home mode, degraded performance mode (if available) or disconnect mode, if the conditions therefor are met while the vehicle is driving. In particular when a vehicle is driving it is desirable to provide a graceful degradation of the vehicle's performance and avoid sudden loss of propulsion power of the vehicle.

In an embodiment the safety system is adapted for controlling the BMS, in case the BMS is switched to the degraded performance mode or to the limp home mode, to maintain supply of power from the battery system to one or more consumers of the first group of consumers, and to disconnect the battery system from one more of the consumers of the second group of consumers. In this manner the amount of power drawn from the battery system is reduced, and consequently the risk of damage to the battery system which may be dangerous to the vehicle's occupants is reduced. Preferably, consumers of the second group consumers which are disconnected from the battery system include a heating system of the vehicle for heating the battery system and/or an air conditioning system of the vehicle for conditioning the air within the vehicle. These systems are known to draw significant amounts of power, and by disconnecting these from the battery system the total power draw from the battery system may be reduced to an extent that prevents further damage to the battery system.

In an embodiment the safety system is adapted for determining that the battery cells operate outside the predetermined voltage range and/or the predetermined temperature range but within predetermined safety margins, in case of only one of:

i) one or two cells of the battery system are detected to operate at a voltage outside of the predetermined voltage range but within a predetermined safety margin thereof, for less than a first predetermined amount of time; or ii) one or more battery cells of the battery system is detected operate at a temperature of between −40° C. and 10° C. for less than a second predetermined amount of time.

Thus, if only i) or ii) is detected, the battery system is not necessarily switched to the disconnected mode, and instead may be switched to the degraded performance mode or the limp home mode. In this manner, a minor detected safety related error does not have to result in cutting power from the battery system to the vehicle's propulsion system. With regard to ii) it is noted that the battery system should generally be operated at a temperature above 10° C., and operation of the battery system when it is at a temperature below −40° C. should generally be avoided.

The voltage and/or temperature at which the battery cells operate may for instance be detected using cell voltage temperature nodes (CVTNs) which are integrated in the battery system of the vehicle. Preferably, the first predetermined amount of time is 60 seconds or less, and/or the second predetermined amount of time is 180 seconds or less.

In an embodiment the safety system is adapted for controlling the BMS to switch to the disconnect mode in case of one or more of:

one or two cells of the battery system are detected to operate at a voltage outside of the predetermined voltage range but within a predetermined safety margin thereof, for less than a first predetermined amount of time; and one or more battery cells of the battery system is detected to be at a temperature between −40° C. and 10° C. for less than a second predetermined amount of time;

any of the cells of the of the battery system is detected to operate for more than the predetermined amount of time at a voltage outside of the predetermined voltage range but within a predetermined safety margin thereof;

any of the cells of the battery system is detected to operate with a voltage outside of the predetermined safety margin;

one or more battery cells of the battery system is detected to be at a temperature of between −40° C. and 10° C. for more than said predetermined amount of time; or one or more battery cells of the battery system is detected to be at a temperature below 40° C.

The BMS is switched to the disconnect mode in case safety related errors are detected that may pose a risk of injury to the vehicle's occupants, and in case multiple less serious errors are detected, e.g. when both i) and ii) occur at the same time. Preferably, the safety system is adapted for switching the BMS to the disconnect mode if it is detected that three or more cells of the battery system operate outside the predetermined voltage and/or temperature range.

In an embodiment the safety system is adapted for detecting a safety related error in the BMS in case of one or more of:

detected internal malfunctioning of a Cell Management System of the BMS;

loss of communication with the Cell Management System; or loss of communication with one or more of Cell Voltage Temperature Nodes (CVTNs) of the battery system, e.g. detected by the BMS.

In case of a single such error, the safety system may switch the BMS to the limp home mode. However, in case of more than one of these errors is detected, the safety system will generally switch the BMS to the disconnect mode. The safety system may be equipped with a BMS diagnostics system that is configured to be connected to the BMS and adapted for detecting the above safety related errors.

In an embodiment the safety related error of the BMS and/or of the battery system is a safety related error in ASIL category B, C, or D. In this embodiment, switching to the limp home mode, the degraded performance mode and the disconnect mode modes is carried out upon detection of safety related errors of the BMS and/or of the battery system only if these errors are errors in ASIL category B, C, or D. The safety system is preferably adapted for, when determining whether to switch to the limp home mode, the degraded performance mode or the disconnect mode, ignoring errors in ASIL category QM.

In an embodiment, the safety system is adapted to be connected to a driver display unit of the vehicle and is adapted for controlling the display unit to:

display a message indicating that the performance of the propulsion system of the vehicle is reduced, in case the BMS is switched to the degraded performance mode;

display a message indicating that the vehicle should be driven to a service provider, e.g. a workshop or an authorized dealer, in case the BMS is switched to the limp home mode; or display a message indicating that the vehicle's propulsion will be stopped within a predetermined time limit, in case the BMS is switched to the disconnect mode.

Preferably, in case the BMS is switched to the limp home mode, the message also indicates the number of vehicle restarts that are still allowed until restarting of the vehicle is blocked. If the BMS is switched to the disconnect mode, preferably the message is repeatedly updated to show the amount of time left until the battery system is disconnected.

According to a second aspect, the disclosure provides a battery electric vehicle comprising a safety system according to the first aspect of the present disclosure.

In an embodiment, the vehicle further comprises:

a high voltage DC bus;

one or more consumers of electricity connected to the high voltage DC bus, said one or more consumers including a first group of consumers with one or more electromotors for driving movement of the vehicle;

a battery system for providing power to the one or more consumers via the high voltage DC bus, wherein the battery system comprises battery cells rated for regular operation within a predetermined voltage range and a predetermined temperature range;

a battery management system (BMS) adapted for controlling power output from the battery system to the one or more consumers; and a battery diagnostics system adapted for detecting safety related errors in operation of the battery system, comprising cell voltage temperature nodes (CVTNs) for detecting temperatures and output voltages of battery cells of the battery system.

The vehicle, which is adapted for transport of persons and/or goods, is thus provided with a graceful degradation of performance in case of errors, so that when low-risk errors are detected the vehicle can keep on driving without requiring a redundant power system for powering the one or more electromotors. In case low risk errors are detected, the risk of damaging the battery system is reduced by preventing charging of the battery system.

In an embodiment the vehicle is a non-hybrid electric vehicle in which the battery system forms a non-redundant power supply for powering the consumers of the first group of consumers for a prolonged period of time, e.g. a period of time of at least 10 minutes. The disclosure thus allows graceful degradation in performance of the vehicle, In an embodiment the vehicle further comprises a heating system adapted for heating the battery and connected to the BMS, and/or further comprises an air conditioning system adapted for conditioning the air temperature within the vehicle and connected to the BMS. The heating system and air conditioning system do not form part of the first group of consumers, and can be disconnected from the battery system in case the BMS is switched to the limp home mode or the degraded performance mode.

BRIEF DESCRIPTION OF THE DRAWINGS

The present invention will be discussed in more detail below, with reference to the attached drawings, in which.

DESCRIPTION OF EMBODIMENTS

Figure 1:
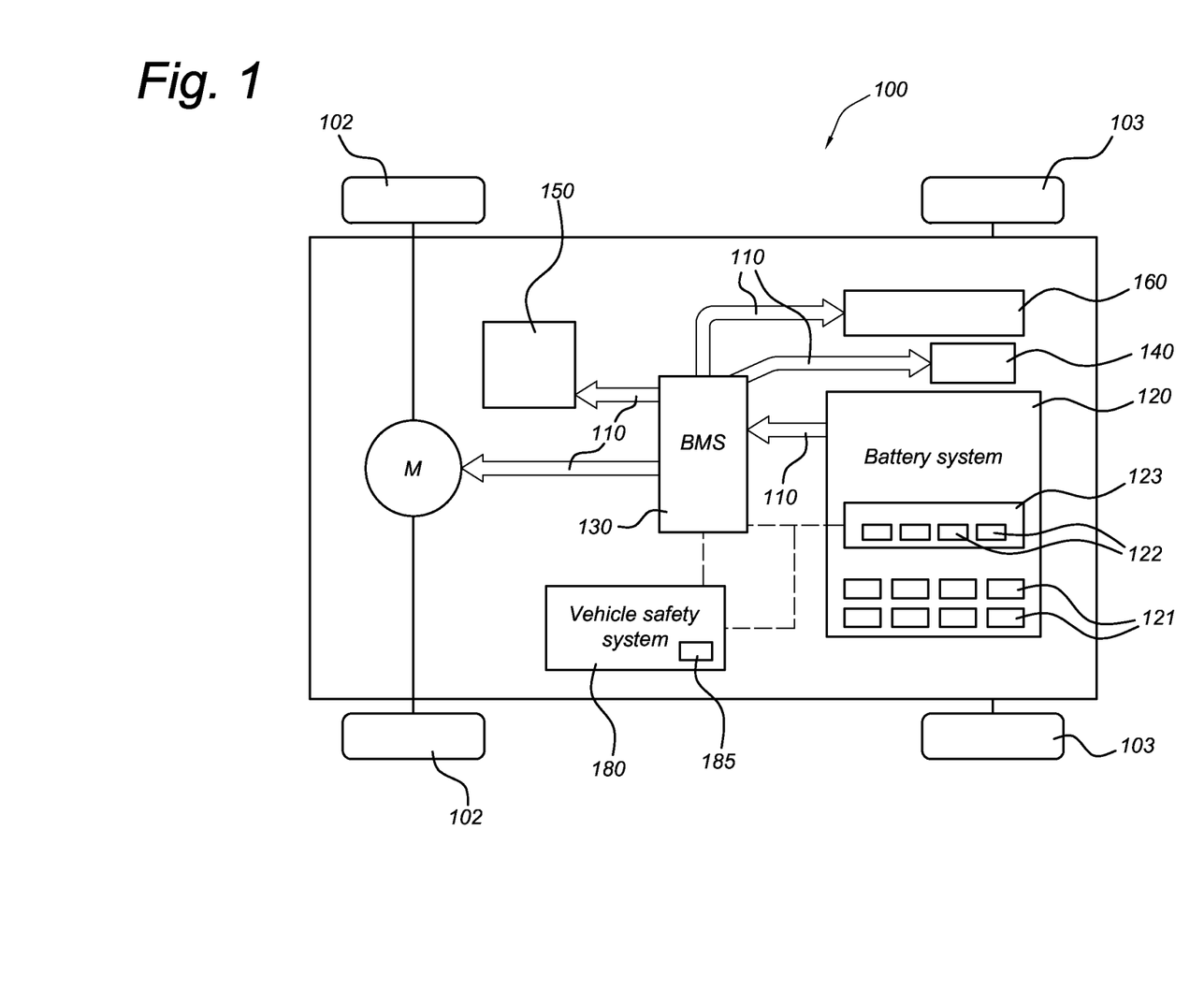
FIG. 1 schematically shows a battery electric vehicle according to the invention.

FIG. 1 shows electric vehicle 100 that is provided with a safety system 180 of the invention. The vehicle is an non-hybrid electric vehicle, i.e. is not equipped with an internal combustion engine for generating power to drive movement of the vehicle. Instead, the vehicle is provided with a battery system 120 which comprises a plurality of battery cells 121, as well as a battery diagnostics system 123 which comprises cell voltage temperature nodes (CVTNs) 122 adapted for detecting cell temperatures and output voltages of battery cells 121. The battery cells 121 are rated for regular operation within a predetermined voltage range and within a predetermined temperature range. The battery system may still function within predetermined safety margins without posing a significant risk of danger in case only one or two of the cells operate outside of the predetermined ranges. The predetermined ranges are generally provided by the manufacturers of the battery cells, and the safety margins of the battery system depend thereon. Besides being adapted for detecting safety related errors of the battery system, the battery diagnostics system 123 shown is also adapted for monitoring regular operation of the battery system, e.g. to determine a State of Charge (SoC) of the battery system 120 even when no safety errors are detected.

The battery system is adapted for providing high voltage power, i.e. at a voltage of at least 360 V, to a battery management system (BMS), which BMS is adapted for selectively providing power to one or more consumers of electricity. The consumers include a electromotor M that is adapted for converting high voltage electricity into motion of wheels 102 for propelling movement of the vehicle, and for providing electrical energy generated during regenerative braking, via the BMS, to the battery system to partially charge the battery system. In FIG. 1, wheels 103 are not powered, though a powered steering system 160, here shown schematically, is provided for assisting in steering the wheels 103. The steering system 160 is powered by the battery system via the BMS 130.

The BMS is connected to further electricity consumers in the form of a heating system 140 for heating the battery system, and an air conditioning system 150 for conditioning the air in the vehicle. In contrast to the steering system 160 and the motor M, if these consumers of electricity are disconnected from the battery system it is still possible to drive the vehicle.

A high voltage direct current (DC) bus 110 connects the battery system 120 to the BMS and connects the BMS 130 to the consumers M, 140, 150 and 160. The dotted lines indicate signal lines between the battery system 120 and the safety system 180 of the present invention, and between the safety system 180 and the BMS 130. The safety system 180 comprises a BMS diagnostics system 185 which is adapted for detecting safety related errors in operation of the BMS.

Examples of safety related errors that the diagnostics system 185 can detect include loss of communication between the BMS and the battery system 120, as well as errors in communication of the BMS with the battery system.

Figure 2:
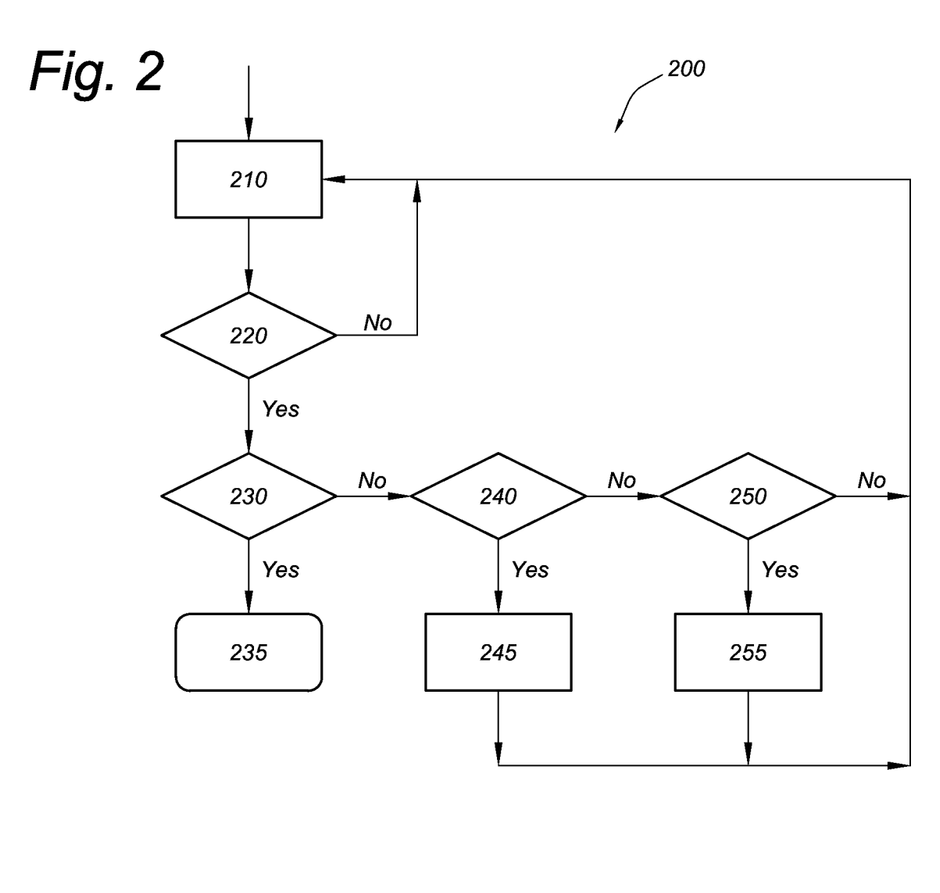
FIG. 2 provides an example of detected safety related errors which result in the degraded performance mode, the limp home mode and the disconnect mode.

The manner in which the safety system 180 operates is shown in more detail in the flow chart 200 of FIG. 2. Generally, during driving, the BMS will be in a normal mode of operation in which charging of the battery system is possible. During driving, the safety system carries out the following steps:

In step 210, the safety system 180 receives data regarding operation of the BMS and the battery system 120. In step 220 the safety system determines whether a safety related error has been detected in the BMS and/or in the battery system. In case no error has been detected, the system loops back to step 210 without changing the mode of the BMS.

Otherwise, if one or more safety related errors have been detected, it is first checked in step 230 whether these errors are likely to cause serious damage to the vehicle and/or its occupants unless the battery system is disconnected, e.g. when there is a risk of harmful outgassing of the battery cells and/or risk of a thermal event of the battery system occurring. This may for instance be the case if the battery system operates outside of the predetermined safety margins, and/or if the BMS operates outside of its predetermined safety margins. If so the BMS is switched to the disconnect mode in step 235, which comprises completely disconnecting the battery system from all consumers, i.e. from electromotor M, battery heating system 140, air conditioning system 150 and powered steering system 160, after at least 10 seconds from detecting the error(s) and within 120 second of the detection. This will shut down the vehicle's propulsion system and will prevent the vehicle from being restarted before repairs have been made. Preferably, a warning is shown to the user on a display of the vehicle, e.g. the dashboard display, indicating when powered propulsion of the vehicle will be stopped. In the disconnect mode, the vehicle is typically prevented from being restarted by the driver unless the error(s) has or have been repaired.

If the error (s) is/are not serious enough to warrant stopping propulsion of the vehicle within 120 seconds, it is checked in step 240 whether the limp home mode should be activated. This may be the case for instance when a single safety error in operation of the BMS has been detected which is within predetermined safety margins and the battery diagnostics system indicates that all battery cells operate within their predetermined voltage and temperature ranges. Such a BMS error may for example be an error detected in a Cell Management System of the BMS, or an error in communication between the BMS and a one or more of the CVTNs. When such errors occur it is advisable to have the vehicle checked by a mechanic before allowing the BMS to switch to its normal operation mode, though it is not necessary to halt driving of the vehicle. If the requirements for switching the BMS to the limp home mode are met, the BMS is switched to the limp home mode in step 245, which comprises limiting the maximum discharge power for the battery system to a predetermined peak value, e.g. at most 40 kW for a peak duration of 10 seconds or less, limiting the maximum continuous discharge value of the battery system, which may be maintained for a time period longer than 10 seconds, to a predetermined continuous discharge value of e.g. 20 kW, and limiting the number of times the vehicle may be restarted to 20. By limiting the continuous and peak discharge power, the risk of outgassing of the batteries and/or of a thermal event occurring is reduced. Preferably, a message is shown to the user on the display of the vehicle, warning that the vehicle is at a reduced propulsion capacity and should be driven to a service provider such as a vehicle repair shop. The message may also indicate the number of times the vehicle may still be restarted by the driver without the error(s) having been resolved. After the limp home mode has been activated in step 245 while the vehicle is being driven, the safety system returns to step 210 during driving, so that the disconnect mode may still be activated if this becomes necessary.

If the error(s) are not serious enough to warrant activation of the limp home mode, it is checked in step 250 whether the BMS should be switched to a degraded performance mode. This is the case when only one or two battery cells of the battery system have been detected to operate outside of their rated ranges, while these cells still operate within the predetermined safety ranges, and when no safety related errors are detected in operation of the BMS. In case only one or two cells of the battery system are defective, the risk of this causing injury to the vehicle's occupants is very low. When in step 255 the BMS is switched to the degraded performance mode, charging of the battery system is blocked, and discharge power of the battery is limited to a first predetermined discharge value of e.g. 40 kW. Once the BMS has been switched to the degraded performance mode, the safety system continues at step 210, so that the disconnect mode or the limp home mode may still be activated while the vehicle is being driven. It is possible that the errors in the battery cells are of a temporary nature. If after a restart of the vehicle no safety related errors are detected while the BMS is in degraded mode, the safety system may switch the BMS back to its normal mode of operation, Switching to the limp home mode 255 and/or switching to the degraded performance mode in step 245, may include controlling the BMS to disconnect any consumers that are not required for propulsion, e.g. the battery heating system 140 and/or the air conditioning system 150 of the vehicle of FIG. 1, to further reduce discharging of the battery.

In summary, the invention provides a safety system and a vehicle provided therewith, which provides different levels of degradation of performance of the vehicle in case safety related errors are detected, depending on a pre-estimated severity of the safety related errors. In case it is estimated that the risk of injury to the vehicles occupant(s) would be greater if the battery is disconnected from the propulsion system of the vehicle than if the vehicle is allowed to continue driving with a lower maximum discharge of the battery system, the BMS is switched to either the degraded performance mode or the limp home mode. In case the risk of injury to the vehicle's occupant(s) is expected to be higher if the vehicle continues driving than if propulsion of the vehicle stopped, is the BMS switched to the disconnect mode.

The invention claimed is:

1. A safety system for an electric vehicle, wherein the electric vehicle further comprise consumers of electricity, wherein the consumers of electricity are partitioned into a first group of consumers comprising one or more consumers associated with a powering steering system and one or more consumers associated with a propulsion system of the electric vehicle, and a second group of consumers that are different from the first group of consumers, the safety system being configured to be in communication with a battery management system, BMS, of the electric vehicle;

wherein the safety system is adapted for, upon detection of one or more safety related errors in operation of the BMS and/or in operation of a battery system of the electric vehicle, controlling the BMS to switch to:

a) a limp home mode, in case a safety related error in operation of the BMS is detected which is within predetermined safety margins and it is detected that all cells of the battery system operate within their predetermined rated voltage range and predetermined rated temperature range, wherein in the limp home mode, a charging power of the battery system is set to zero, supply of power from the battery system to the first group of consumers is maintained, and supply of power from the battery system to one or more of the consumers of the second group of consumers is disconnected; and b) a disconnect mode, in case the battery system is detected as operating outside predetermined safety margins or one or more safety related errors in operation of the BMS outside predetermined safety margins are detected, wherein in the disconnect mode, the battery system is completely disconnected from the first group of consumers and the second group of consumers after a predetermined amount of time from said detecting.

2. The safety system of claim 1, wherein the safety system is adapted for, upon detection of one or more safety related errors in operation of at least one of the BMS or the battery system of the electric vehicle, controlling the BMS during driving of the electric vehicle, to switch to c) a degraded performance mode, in case it is detected that only one or two battery cells of the battery system at least one of operate outside their predetermined rated voltage range or outside their predetermined rated temperature range but within predetermined safety margins, wherein in the degraded performance mode charging of the battery system is blocked and peak discharge power of the battery system is limited to within a second predetermined discharge value.

3. The safety system of claim 2, wherein in the degraded performance mode the supply of power from the battery system to the first group of consumers is maintained, and the supply of power from the battery system to the one or more of the consumers of the second group of consumers is disconnected.

4. The safety system of claim 1, wherein the second group of consumers comprise at least one of one or more consumers associated with a heating system for heating the battery system or one or more consumers associated with an air conditioning system for conditioning air within the electric vehicle.

5. The safety system of claim 1, wherein the safety system is adapted for determining that the battery cells operate at least one of outside the predetermined rated voltage range or outside the predetermined rated temperature range but within predetermined safety margins, in case of only one of:

i) one or two cells of the battery system are detected to operate at a voltage outside of the predetermined rated voltage range but within a predetermined safety margin thereof, for less than a first predetermined amount of time; or ii) one or more battery cells of the battery system is detected to be at a temperature between −40° C. and 10° C. for less than a second predetermined amount of time.

6. The safety system of claim 5, wherein the safety system is adapted for controlling the BMS to switch to the disconnect mode in case of one or more of:

one or two cells of the battery system are detected to operate at the voltage outside of the predetermined rated voltage range but within the predetermined safety margin thereof, for less than the first predetermined amount of time; and one or more battery cells of the battery system is detected to be at the temperature between −40° C. and 10° C. for less than the second predetermined amount of time;

any of the cells of the of the battery system is detected to operate for more than the first predetermined amount of time at the voltage outside of the predetermined rated voltage range but within the predetermined safety margin thereof;

any of the cells of the battery system is detected to operate with a voltage outside of the predetermined safety margin;

one or more battery cells of the battery system is detected to be at the temperature of between −40° C. and 10° C. for more than said second predetermined amount of time; or one or more battery cells of the battery system is detected to be at a temperature below −40° C.

7. The safety system of claim 1, wherein the safety system is adapted for detecting the safety related error in operation of the BMS in case of one or more of:

detected internal malfunctioning of a Cell Management System of the BMS;

loss of communication with the Cell Management System; or loss of communication with one or more of Cell Voltage Temperature Nodes (CVTNs) of the battery system.

8. The safety system of claim 1, wherein the safety related error of at least one of of the BMS or the battery system is in ASIL category B, C, or D according to ISO standard 26262-9:2018.

9. The safety system of claim 1, wherein in the limp home mode, discharge of the battery is limited to a first predetermined discharge value that is 60 kW or less, preferably 45 kW or less.

10. The safety system of claim 9, wherein the first predetermined peak discharge value is 60 kW or less, preferably 45 kW or less over a maximum a 10 seconds, and wherein in the limp home mode, the discharge of the battery is further limited to a first predetermined continuous discharge value that is 25 kW or less, preferably 20 kW or less.

11. The safety system of claim 2, wherein the safety system is adapted to be connected to a driver display unit of the electric vehicle and is adapted for controlling the driver display unit to at least one of:

display a message indicating that performance of the propulsion system of the electric vehicle is reduced, in case the BMS is switched to the degraded performance mode;

display a message indicating that the electric vehicle should be driven to a service provider, in case the BMS is switched to the limp home mode; or display a message indicating that the electric vehicle's propulsion will be stopped within a predetermined time limit, in case the BMS is switched to the disconnect mode.

12. A battery electric vehicle comprising:

a safety system for the batter electric vehicle, wherein the battery electric vehicle further comprises consumers of electricity, wherein the consumers of electricity are partitioned into a first group of consumers comprising one or more consumers associated with a powering steering system and one or more consumers associated with a propulsion system of the electric vehicle, and a second group of consumers that are different from the first group of consumers, the safety system being configured to be in communication with a battery management system, BMS, of the electric vehicle;

wherein the safety system is adapted for, upon detection of one or more safety related errors in operation of the BMS and/or in operation of a battery system of the battery electric vehicle, controlling the BMS to switch to:

a) a limp home mode, in case a safety related error in operation of the BMS is detected which is within predetermined safety margins and it is detected that all cells of the battery system operate within their predetermined rated voltage range and predetermined rated temperature range, wherein in the limp home mode, a charging power of the battery system is set to zero, supply of power from the battery system to the first group of consumers is maintained, and supply of power from the battery system to one or more of the consumers of the second group of consumers is disconnected; and b) a disconnect mode, in case the battery system is detected as operating outside predetermined safety margins or one or more safety related errors in operation of the BMS outside predetermined safety margins are detected, wherein in the disconnect mode, the battery system is completely disconnected from the first group of consumers and the second group of consumers after a predetermined amount of time from said detecting.

13. The battery electric vehicle of claim 12, wherein the battery electric vehicle is a non-hybrid electric vehicle in which the battery system forms a non-redundant power supply for powering the consumers of the first group of consumers for a prolonged period of time.

14. The battery electric vehicle of claim 12, wherein the second group of consumers comprise at least one of one or more consumers associated with a heating system adapted for heating the battery system and connected to the BMS or one or more consumers associated with an air conditioning system adapted for conditioning an air temperature within the battery electric vehicle and connected to the BMS.

15. The battery electric vehicle of claim 12, wherein the safety system is adapted for, upon detection of one or more safety related errors in operation of at least one of the BMS or the battery system of the battery electric vehicle, controlling the BMS during driving of the battery electric vehicle, to switch to c) a degraded performance mode, in case it is detected that only one or two battery cells of the battery system at least one of operate outside their predetermined rated voltage range or outside their predetermined rated temperature range but within predetermined safety margins, wherein in the degraded performance mode, charging of the battery system is blocked and peak discharge power of the battery system is limited to within a second predetermined discharge value.

16. The battery electric vehicle of claim 15, wherein in the degraded performance mode the supply of power from the battery system to the first group of consumers is maintained, and the supply of power from the battery system to the one or more of the consumers of the second group of consumers is disconnected.

17. The battery electric vehicle of claim 12, wherein the safety system is adapted for determining that the battery cells operate at least one of outside the predetermined rated voltage range or outside the predetermined rated temperature range but within predetermined safety margins, in case of only one of:

i) one or two cells of the battery system are detected to operate at a voltage outside of the predetermined rated voltage range but within a predetermined safety margin thereof, for less than a first predetermined amount of time; or ii) one or more battery cells of the battery system is detected to be at a temperature between −40° C. and 10° C. for less than a second predetermined amount of time.

18. The battery electric vehicle of claim 17, wherein the safety system is adapted for controlling the BMS to switch to the disconnect mode in case of one or more of:

one or two cells of the battery system are detected to operate at the voltage outside of the predetermined rated voltage range but within the predetermined safety margin thereof, for less than the first predetermined amount of time; and one or more battery cells of the battery system is detected to be at the temperature between −40° C. and 10° C. for less than the second predetermined amount of time;

any of the cells of the of the battery system is detected to operate for more than the first predetermined amount of time at the voltage outside of the predetermined rated voltage range but within the predetermined safety margin thereof;

any of the cells of the battery system is detected to operate with a voltage outside of the predetermined safety margin;

one or more battery cells of the battery system is detected to be at the temperature of between −40° C. and 10° C. for more than said second predetermined amount of time; or one or more battery cells of the battery system is detected to be at a temperature below −40° C.

19. The battery electric vehicle of claim 12, wherein the safety system is adapted for detecting the safety related error in operation of the BMS in case of one or more of:

detected internal malfunctioning of a Cell Management System of the BMS;

loss of communication with the Cell Management System; or loss of communication with one or more of Cell Voltage Temperature Nodes (CVTNs) of the battery system.

20. The battery electric vehicle of claim 15, wherein the safety system is adapted to be connected to a driver display unit of the battery electric vehicle and is adapted for controlling the driver display unit to at least one of:

display a message indicating that performance of the propulsion system of the battery electric vehicle is reduced, in case the BMS is switched to the degraded performance mode;

display a message indicating that the battery electric vehicle should be driven to a service provider, in case the BMS is switched to the limp home mode; or display a message indicating that the battery electric vehicle's propulsion will be stopped within a predetermined time limit, in case the BMS is switched to the disconnect mode.

* * * * *